June 4, 1963 H. L. BUNKER, JR., ETAL 3,092,163
ELASTOMERIC ANTI-SKID TRACTION DEVICE
Filed Oct. 27, 1961 2 Sheets-Sheet 1

INVENTORS
HENRY L. BUNKER, JR.
EDWARD F. LEWIS
WILLIAM J. POWERS, JR.

C.E.Bartsch
AGENT

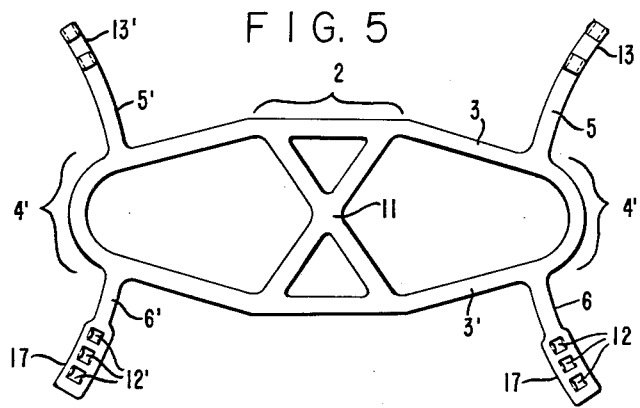
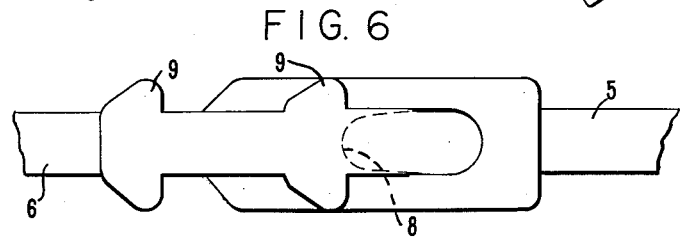
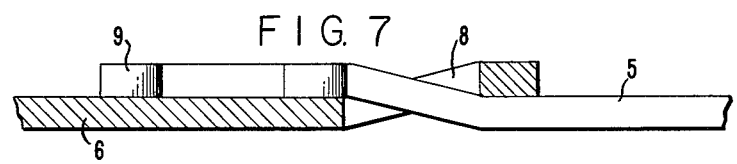
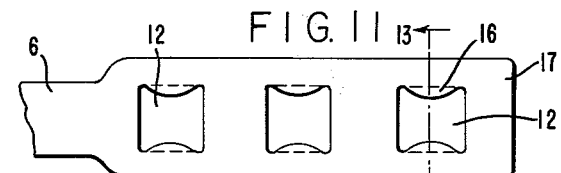
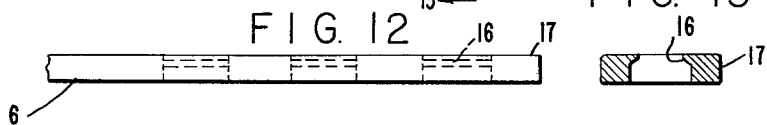
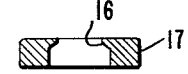
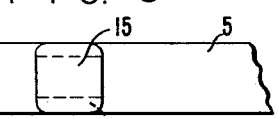
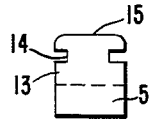
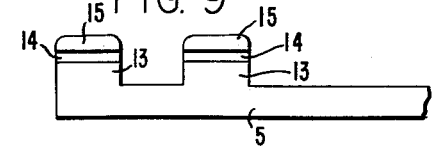
INVENTORS
HENRY L. BUNKER, JR.
EDWARD F. LEWIS
WILLIAM J. POWERS, JR.
*C. E. Bartsch*
AGENT

United States Patent Office 3,092,163
Patented June 4, 1963

3,092,163
ELASTOMERIC ANTI-SKID TRACTION DEVICE
Henry L. Bunker, Jr., Swarthmore, Pa., and Edward F. Lewis and William J. Powers, Jr., Wilmington, Del., assignors to E. I. du Pont de Nemours and Company, Wilmington, Del., a corporation of Delaware
Filed Oct. 27, 1961, Ser. No. 148,090
10 Claims. (Cl. 152—221)

This invention relates to an elastomeric anti-skid device intended for mounting circumferentially on a pneumatic tire of a conventional vehicle for the purpose of promoting traction, particularly under severe conditions that prevail in the presence of ice, snow or mud, and of improving braking under these conditions.

For the purpose of increasing traction and braking effectiveness, it is customary practice to either temporarily mount strong metal chains, e.g., ordinary steel chains or bar-reinforced steel chains, on the power-driven vehicle wheels or to more permanently equip these wheels with snow tires having a unique tread characterized by a significantly coarser pattern than that of ordinary pneumatic tire treads. These chains may be either of the all-around type having a plurality, usually at least eight, of transverse crosslinks, uniformly spaced apart or emergency strap chains having only several crosslinks per unit. Although all-around chains, especially the chains having bar-reinforced tread links, are particularly effective in providing increased traction and improved braking efficiency, metal chains have distinct disadvantages. They produce a rough ride and are noisy, especially on ice, thin snow and bare roads. Chain-equipped wheels driven at sub-normal highway speeds on bare or thinly coated roads exhibit severe wear of the chains, chains being worn to severance during several hours' use on bare pavement. Severance of one or more links causes the broken links, under the centrifugal force of the driven wheel, to repeatedly and forcefully strike the fender or wheel enclosure. Aside from the annoyance of the striking chain, the striking metal can cause significant damage to the struck body part and the protective coating thereon. A whipping metal chain may cause damage to hydraulic fluid lines of the braking system or even become entangled with mechanical braking means. Because of rapid wear and the potential hazards resulting from broken metal chain links, manufacturers generally recommend that metal chains be driven at speeds no greater than about 35 miles per hour.

For the purpose of conserving the useful life of the chains, it is necessary to remove them promptly from the wheels when it is apparent that adequate traction is provided in their absence. One is repeatedly faced with the annoying procedure of applying and removing chains, and this repetitious operation may be frequent and necessary under unpleasant conditions.

One alternative in the direction of avoiding the disadvantages of chains, particularly avoiding the necessity of repeatedly applying and removing chains to accommodate variations in road conditions, is the use of winter tread tires, sometimes referred to as snow or mud tires, having a thick tread of coarse pattern to provide cleat-like protuberances which provide traction without significant build-up of packed snow in the tread.

Although equipping the driven wheels with winter tread tires offers some advantages over chain-equipped wheels from the standpoint of repetitious application and removal of the means of added traction, it is well established that the braking efficiency and traction of winter treads ordinarily is significantly less than that provided through the use of metal chains. The winter tread tires are noisy and usually do not have the wearing quality of ordinary tread tires. Use of winter tread tires generally involves investment in two tires in addition to the ordinary four or five standard tire equipment of the vehicle and may involve one or two extra wheels unless there is a preference for seasonal exchange mounting of the snow treads and ordinary tires with one pair of wheels. This investment is greater than the cost of good quality chains. Furthermore, the effectiveness of the winter tread diminishes with wear and ordinarily the effectiveness after one season's use is not significantly better than the traction obtained with ordinary tread tires.

The principal objectives of this invention are to provide an elastomeric anti-skid traction device, the use of which minimizes many of the aforementioned disadvantages associated with the use of metal chain and winter tread tires. More specifically, these objectives include:

(a) To provide an anti-skid device which can be temporarily mounted on tires on vehicle wheels to improve their traction and braking effectiveness in snow, mud and on frozen road surfaces;

(b) To provide a resilient anti-skid device having traction and braking effectiveness in snow and mud significantly better than ordinary snow/mud winter tread tires;

(c) To provide a resilient anti-skid device having a tread characterized by superior wear resistance on bare or thinly covered roads which permits the temporarily mounted anti-skid device to be used more extensively under varying road conditions without significant sacrifice in useful life;

(d) To provide a resilient anti-skid device which is significantly more quiet-running at all normal road speeds in comparison with metal chains;

(e) To provide a resilient anti-skid device which when severely worn or broken will not cause significant damage to the vehicle in the wheel area.

These objectives, and still other important objectives hereinafter disclosed, are accomplished by circumferentially surrounding a tire of a driving wheel of a vehicle with a plurality of elastomeric traction units separably interlocked to provide an annular-like shape, each of the traction units being of unitary structure of elastomeric material characterized by superior tread life in comparison with steel chains. Each of these elastomeric traction units has at least two transverse crosslink bands, and ordinarily no more than four, extending between and being joined at the respective ends thereof to a pair of side linking means separably interlockable as peripheral side loops. Each traction unit has a tread section consisting of a tread mid-portion of the respective transverse crosslink bands and at least one patterned tread cross-member integrally joining with said mid-portions of two adjacent transverse crosslink bands. When there are more than two transverse crosslink bands, one or more cross-members extend between the first and second transverse crosslink bands, one or more cross-members extend between the second and third transverse and so forth. The patterned tread cross-member consists of a plurality of spaced-apart cross-bands, including at least two of such cross-bands each extending between two adjacent transverse crosslink bands and being integrally joined therewith at an acute angle at the respective ends of the bands of the cross-member. Tread cross-members which are X-shaped or theta-shaped, i.e., substantially symmetrical patterns, are preferred. One or more of these patterned cross-members joined to the respective mid-portions of adjacent transverse crosslink bands define an open network tread pattern adapted to function in the same manner as the tread of snow-mud tires. Preferably, the tread section of each unit includes the tread mid-portion of each of two transverse crosslink bands integrally joined by a centrally disposed single symmetrically patterned tread cross-member.

The surface of the tread section which contacts the road surface ordinarily is substantially smooth. The reverse side of the elastomeric traction unit which is in contact with the pneumatic tire may be smooth or it may be provided with protuberances or other irregularities in the surface for the purpose of minimizing slippage between the traction unit and the tire.

In preferred embodiments, the respective transverse crosslink bands are integrally joined at the ends thereof to elastomeric spring-acting side member bands. Each of the spring-acting side member bands are integrally joined with a pair of side-linking straps adapted to be separably interlocked in end-to-end relationship with the respective side linking straps of like second and third traction units. Ordinarily, from four to twelve, preferably six to nine, of like traction units as described are interlocked to provide the annularly-shaped anti-skid traction device. The spring-acting side member band, together with the pair of side linking straps, generally define an arc of a circle, the angle of which is approximately $$\frac{360°}{n}$$

where $n$ in the number of traction units makes up the interlocked annularly-shaped traction device. Each pair of side linking straps is provided with interlocking means including at least one male linking element and at least one female linking element counterpart to the male linking element. Preferably, the male linking element on one side linking strap has two or more spaced stud-like protuberances which are grooved to function in combination with integral lips of the female linking element as the interlocking means. The second companion side linking strap, representing the female linking element, has two or more spaced perforations, each perforation having a pair of lips integral therewith adapted to engage with a pair of grooves in the stud of the male interlocking element. A plurality of stud-like protuberances and/or a plurality of perforations provide a multiplicity of adjustments to accommodate variations in tire size.

Any of the vulcanized rubber compositions formulated with natural, synthetic or mixed natural and synthetic rubbers adapted for use in vehicle tire construction, particularly tire tread, can be used as the elastomer in the preparation of anti-skid units. Still other polymers of high molecular weight characterized by adequate toughness, resiliency, wear-resistance and weather-resistance suitable for tire construction can be used as the structural material of the anti-skid unit. Polyurethane rubbers are preferred. These polyurethane rubbers are condensates of an excess of an organic diisocyanate with a hydroxyl-terminated, water-insoluble polyether or polyester to provide an isocyanate-terminated prepolymer. The prepolymer is cured with materials having a plurality of active hydrogens capable of reacting with the remaining free isocyanate groups of the prepolymer to cure it to a high molecular weight elastomer. The polyurethane elastomer resulting from the curing of a prepolymer of two mols of toluene dissocyanate per mol of polyoxyalkylene glycol having four carbon atoms in the alkylene radical and a molecular weight in the range of about 700 to 2000, especially about 1000, are preferred. A particular preferred curing agent is dichloromethylene dianiline. These rubbers, elastomers and rubber-like polymers may be pigmented, filled or reinforced with suitable materials, e.g., natural or synthetic fibers such as nylon, "Dacron" polyester fiber, and rayon, glass, or metal.

The thickness of the tread section of the traction unit may be approximately the same as that of the side band members and the transverse crosslink bands, but in the interest of increased tread life on the wearing surface and a deeper tread pattern for biting into snow, the tread section, defined by the patterned cross-member, e.g., X-shaped or theta-shaped, and the respective tread mid-portions, of the transverse crosslink bands, having a length approximately equal to the width of the cross-member integrally joined thereto or slightly longer, ordinarily is initially from 20% to 300% thicker than the side member bands, preferably from about 33% to about 150% thicker. A typical average thickness of the side bands is about 0.25 inch, the preferred initial tread thickness being in the range of from about 0.33 to about 0.625 inch.

A more detailed description is accomplished by reference to the accompanying drawings.

FIGURE 1 shows a plurality of elasomeric anti-skid traction units joined together end-to-end by separable interlocking means to form an annular structure circumferentially surrounding the periphery of a pneumatic tire 1. Each of the elastomeric traction units is a unitary structure which preferably consists of a tread section 2, transverse crosslink bands 3, spring-acting side member bands 4, and paired linking side straps 5 and 6, linking side strap 5 having a male linking element of separable interlocking means, and linking side strap 6 having a perforation as a female linking element adapted to engage the male linking element of a like neighboring traction unit and in combination therewith provides a separable interlocking means.

FIGURES 3, 4 and 5 are illustrative of the elastomeric traction units modified in design, the features of each of these alternative structures being described in detail hereinafter.

Figure 3:
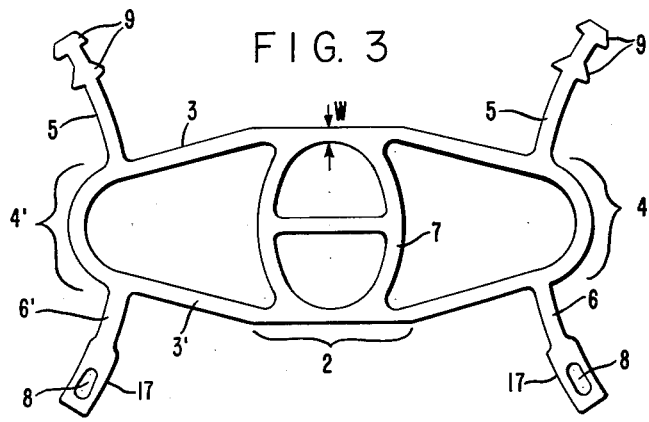

In FIGURE 3, in the center of the tread section 2 is a patterned cross-member 7, theta-shaped, joined integrally at the top and bottom of the theta pattern with adjacent transverse crosslink bands 3 and 3'. The entire tread section 2, including the respective portions of the transverse cross-link bands each integrally joined to the theta-shaped cross-member and having a length about equal to the width of the theta cross-member and the entire theta-patterned cross-member 7, usually is thicker than the remaining portions of the traction unit to provide improved wear life as well as to promote better traction. As indicated hereinbefore, the thickness of the tread section preferably is from about 0.33 to 1.5 times greater thickness than the remainder of the structure. The width W of the structural material of the transverse cross-linking bands 3 and 3', the side band members 4 and 4', and the patterned cross-member 7, is substantially uniform, a typical average width being about 0.5 inch. Other widths may be used, ordinarily no greater than 1 inch. The ratio of width to thickness of the respective bands, other than the portions making up the tread section, preferably is at least 1.5 times the thickness. Thus, at 0.25 inch thickness, the width of the respective bands is at least 0.37 inch. The transverse crosslinking bands 3 and 3', at their respective extremities, are joined integrally with the spring-acting side member bands 4 and 4'. Each of these side member bands has integral therewith a pair of side linking straps 5 and 6. The linking straps are generally arcuate and the arcuate linking straps 5 and 6 integrally joined with the spring-acting side member band 4 usually has arcuate dimensions defined by an angle of approximately $$\frac{360°}{n}$$

where $n$ is the number of interlocked traction units making up the annular structure. For a combination of six interlocked units, the angle is approximately 60°, $n$ being 6. As the number of units $n$ increases, the size of the angle defining the arc decreases.

The distance between the respective arcs defining the arcuate side linking means generally is in the range of 8 to 14 inches, preferably 9 to 13 inches, but may be longer to accommodate larger tires or shorter to accommodate smaller tires. The width of the patterned cross-member of the tread section ordinarily is in the range of about 4 to 8 inches in its maximum dimension. The linear length of the patterned tread portion of a single unit usually is in the range of 4 to 8 inches. The patterned cross-member preferably is symmetrical, the theta-shaped member embodied herein and the X-shaped member of FIGURES 4 and 5 being representative symmetrical cross-members. One member of each pair of side linking straps, i.e., 6 and 6', has a widened portion 17 to accommodate a slot-like perforation 8 which functions as the female element of the interlocking means. The companion member of each of the respective pairs of linking straps, i.e., 5 and 5', has at the extremity thereof one or more protuberances 9 which function as the male member of the interlocking means and are adapted to be inserted through the slot-like perforation 8 of the counterpart side linking strap 6 of the next adjacent traction unit.

Figure 4:
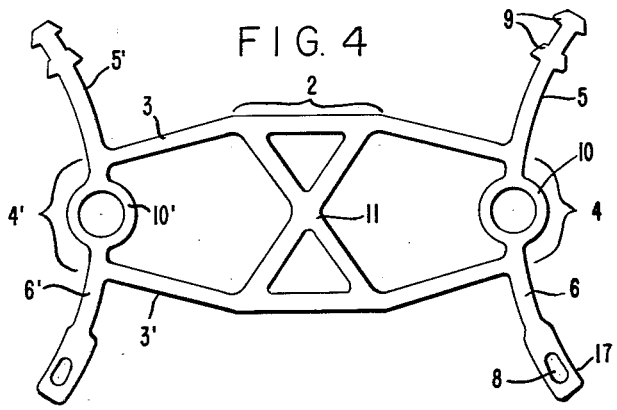

FIGURE 4 illustrates an alternative embodiment of the anti-skid traction unit shown in FIGURE 3 having in the spring-acting side member bands 4 and 4', generally toroidal sections 10 and 10' centrally located between the transverse crosslink bands 3 and 3'. An X-shaped cross-member 11 is used in place of the theta patterned cross-member 7 of FIGURE 3. The toroidal sections, like the arcuate side members of FIGURE 3, impart springiness to an assembly of the traction units such that when a plurality of the traction units are assembled annularly about the periphery of a tire, the side linking straps in combination with the side member band having the toroidal section may be pulled taut manually in a circumferential direction on the tire when the respective protuberances 9 are inserted in the respective slot-like perforations 8 for interlocking the traction units in end-to-end relationship. The springiness or elasticity of the respective pairs of side members having the toroidal sections 10 and 10', like the arcuate spring section of the side members of FIGURE 3, will maintain a state of tightness in the entire interlocked assembly by virtue of distortion of the respective toroids into a generally ellipsoidal form.

Figure 1:
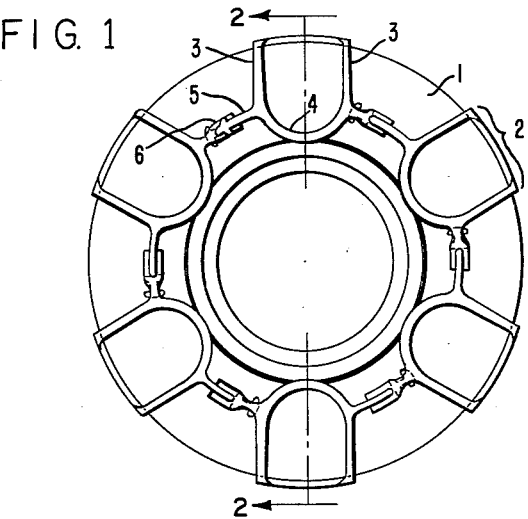

The shape of the spring-acting portion of the side member band 4 may be varied widely, e.g., it may be generally arcuate in shape as illustrated in FIGURES 1 and 3, generally toroidal as illustrated in FIGURE 4, square, triangular, polygonal, elliptical, etc.

FIGURE 5 illustrates a particularly preferred embodiment of the anti-skid traction unit wherein the patterned cross-member is X-shaped and the respective spring-acting side member bands 4 and 4' each has an arcuate spring section as illustrated heretofore in FIGURES 1 and 3. The arc of the spring section has a radial center in the direction opposite to that of the radial center of the arc defining the over-all combination of the spring-acting side member band 4 plus the pair of arcuate side linking straps 5 and 6 joined integrally to the side member band 4. The radius of this reverse arc of the spring section of the spring-acting side member 4 ordinarily is significantly less than the radius of the arc defining the aforementioned over-all combination of side member band and side linking straps. Ordinarily, the radius of this reverse arc spring section is no greater than about one-third of the radius of the arc of the linking combination. In a typical design as illustrated by FIGURE 5, the radius of the reverse arc of the spring section 4 is about 2 to 2.5 inches versus about a 10-inch radius for the greater arc.

FIGURE 5 further illustrates a preferred embodiment of the interlocking means having three spaced, substantially square perforations 12 in a widened portion 17 of a side linking strap 6 to function as the female element of the interlocking means. The companion member side linking strap 5 has two spaced, substantially square stud-like protuberances 13 projecting vertically therefrom.

The dimensions and spacing of the perforations are such as to coincide with the spaced studlike protuberances of an adjacent traction unit for interlock-engagement.

Figure 2:
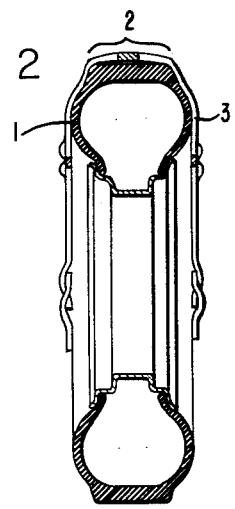
FIGURE 2 shows a cross-section view, taken along the line 2—2 of FIGURE 1, of a tire peripherally encased by the anti-skid device made up of a plurality of the elastomeric traction units.

FIGURE 6 shows details of the interlocking means, illustrated in FIGURES 2 and 3, consisting of the combination of a female element of a side linking strap 6 having the slot-like perforation 8 of one traction unit and a companion male element, in interlocked position, of a side linking strap 5 having a dogbone-shaped pair of protuberances 9 of an adjacent traction unit. The pair of protuberances provide two positions of adjustment. Further, adjustment may be provided by additional protuberances on the side linking strap 5. Still further, adjustment may be provided by additional slot-like perforations 8 in the widened portion 17 of the side linking strap 6. These adjustments permit the take-up of slack in the annularly-shaped traction device and permit the use of the device of a given size on more than one tire size. In interlocking, the dogbone-shaped pair of protuberances 9 are adapted to be turned about 90° for insertion through the slot-like perforation 8 to effectively join a side linking strap of one traction unit with a separably interlockable side linking strap of the next adjacent traction unit.

FIGURE 7 is a cross-section side view of the separable interlocking means illustrated in FIGURE 6.

FIGURE 8 is a top view of the side linking strap 5 having two spaced, resilient, stud-like protuberances 13 providing the male element of the interlocking means. FIGURE 9 is a side elevation view of FIGURE 8 and FIGURE 10 is a left end view of FIGURE 9. In this series of figures, the stud-like protuberance 13 is substantially square having a width about the same as the width of the strap 5 from which the stud-like protuberance 13 projects substantially vertically to a height about twice the thickness of the strap 5. Two opposing sides of the square stud each have a notch or groove 14. The head 15 of the stud 13 is slightly rounded. The side grooves 14 in combination with the head 15 of the stud facilitates engagement of the stud with a substantially square perforation 12 of a companion linking strap 6. The side grooves in the studs are located at a height above the strap 5 approximately equal to the thickness of the strap 6.

FIGURE 11 is a top view of the side linking strap 6 having several substantially square perforations 12 and integral side lips 16 adapted to engage two or more studs 13 with their respective grooves 14 of side linking strap 5 to provide separable interlocking means. FIGURE 12 is a front view of FIGURE 11 and FIGURE 13 is a cross section view at the line 13—13 of FIGURE 11. In this series of figures, 12 is a substantially square perforation in a widened portion 17 of the linking strap 6. The width of 17 is about twice the width of the stud 13, i.e., approximately twice the respective widths of the side linking straps 5 and 6. The dimensions of the perforation 12 are slightly greater than those of the stud 13 such as to snugly engage the stud.

The elastomeric traction units, having a unitary structure as defined above, are manufactured most conveniently by pouring suitably mixed, uncured elastomeric material or plastic material into an open mold, curing the material, and then stripping the cured unitary structure from the mold. Polyurethane rubber is particularly preferred as the elastomeric material. However, any ordinary elastomeric or polymeric materials which have tough resilient rubber-like characteristics suitable for tire fabrication can be used. The mold may comprise a machined or cast cavity in a wood, metal or plastic or sheet metal pressed to the desired shape. Curing conditions conform with the ordinary requirements characterizing the particular elastomer or polymer composition being used. After forming the unitary structure in the mold as a substantially flat anti-skid unit, it is preferably post-treated after removal from the mold to provide it with a retentive U shape to more closely conform with the cross-section of a tire, i.e., the post-formed unit has is spring-acting side member bands substantially vertical in reference to the horizontal tread portion. The traction unit in the post-formed state facilitates installation of a plurality of units annularly around the tire. Post-forming may be accomplished by heating under conditions ranging from overnight at about 200° F. to about two hours at about 320° F.

In the following examples the polyurethane rubber is the cured product of a prepolymer of two mols of toluene diisocyanate per mol of polytetramethyleneether glycol of about 1000 molecular weight crosslinked with dichloromethylenedianiline, the prepolymer having about 6% by weight of available isocyanate groups. Natural rubber compositions, neoprene rubber and Buna S rubber substituted for the polyurethane rubber in the unitary structures ordinarily do not provide all the advantages which are contributed by the preferred polyurethane rubber.

*Example 1*

A series of anti-skid traction units constructed of polyurethane rubber and having the design including an X-shaped cross-member as shown in FIGURE 5, except that the side linking straps are omitted, are assembled having the extremities of the elastomeric transverse crosslink bands joined to conventional side loops of metal chain. The resulting annular anti-skid device, entirely elastomeric except for the linking side loops of metal chain, are circumferentially mounted on a 7.50 x 14 tire on a drive wheel of a Chevrolet 1961 sedan equipped with an automatic transmission. Another anti-skid assembly of the same structure is mounted on a second drive wheel. The following results are based on comparative tests conducted in the vicinity of Burlington, Vermont, with ambient temperatures ranging from 27° to 30° F. Steel chains having reinforced crosslinks, i.e., chains having an extra bar welded to the tread portion of the steel crosslinks, is used as the comparative traction means.

(a) On a level surface, having 2 inches of loose snow on top of irregular packed snow and ice, gradual acceleration without wheel slippage requires a time period of about 4 seconds to travel 30 feet with either the metal chain or the invention traction device.

(b) Under the same conditions as in (a), except acceleration with wheel slippage, a time period of 3 seconds is required with either traction means to travel the 30 feet.

(c) Under the same conditions as in (a), except for a 2½% upgrade, a period of 5 seconds is required for travel of 30 feet with either the metal chains or the elastomeric traction means of this invention.

(d) Under the same conditions as in (c), except with the wheels spinning, a period of 4 seconds for 30 feet travel is required for both the elastomeric traction device and the reinforced metal chains.

(e) On a level surface with a depth of 10 inches of loose snow, and under slow acceleration, a period of 7 seconds is required to travel 60 feet with the conventional metal chains and with the elastomeric traction device.

(f) Under the same conditions as in (e), except with fast acceleration, a period of about 3.4 seconds is required to travel 30 feet with either of the traction devices.

From the foregoing comparisons, it is recognized that the performance of the elastomeric anti-skid traction device in loose snow is equivalent to that of conventional bar-reinforced metal chains.

In a further test (g), on a 5.5° grade covered with tightly packed snow, starting from a dead stop, the traction wheels having the elastomeric traction device rapidly and forcefully dig through the snow until the substrate is bared, then the digging ceases, and the vehicle is accelerated forward. Under the same conditions, the wheels having the chain traction means dig through the packed snow and continue to dig into the thus uncovered substrate consisting primarily of frozen earth and rock fragments without any appreciable tractive effort. Under these conditions the elastomeric traction device exhibits a significant advantage over the metal chains. In this series of tests, braking effectiveness of the elastomeric traction device is comparable with that of metal chains.

*Example 2*

Another series of tests under similar conditions are carried out using an elastomeric traction device made up of a plurality of units constructed of molded polyurethane rubber and having a design as shown in FIGURE 3, i.e., the unitary elastomeric structure includes the interlocking elastomeric side linking straps in place of the conventional side chains present in the initial traction device and the tread section includes a theta-shaped cross-member. The traction performance of this all-elastomeric anti-skid traction device is comparable with the metal side-chain-linked elastomeric device of Example 1. The advantages in the elastomeric side linking combination resides in its provision of freedom from noise which may occur with loose or broken metal chain striking the fender, and provision of a multiplicity of circumferential adjustments for maintaining the device taut without signifiacnt unbalance which may ordinarily occur with metal chains having only one connecting means in the circumferential side chain loop. The unitary elastomeric structure of the traction units provides springiness which cannot be provided by metal link side chains. This spring action of side member bands in combination with the side linking straps eliminates any need for supplemental springing means for maintaining the traction device taut, such supplemental means ordinarily being required with metal chains.

*Example 3*

A series of anti-skid traction units made of polyurethane rubber, having the design substantially as shown in FIGURE 5, except that the interlocking means consists of the combination of the dogbone-like protuberances and the slot-like perforations shown in FIGURE 6, are assembled in end-to-end relationship to circumferentially surround each of a pair of 7.50 x 14 inch tires mounted on the drive wheels of a 1960 Chevrolet sedan. The car is driven at sustained speeds of 50 to 55 miles per hour on bare black top asphalt/stone and concrete highways in the State of Delaware with the prevailing ambient temperature in the range of 50° to 60° F. for wear performance. A distance of 678 miles is covered to the initial failure in the form of a bending failure rather than wear-through failure. In this distance, the polyurethane rubber tread section of the traction units exhibits no significant wear. The traction units, as molded, initially have leading and trailing edges which are sharp and square, i.e., 90° in reference to the flat tread surface. In the wear test there is a slight rounding of the leading edges of the elastomeric transverse crosslink bands and slight beveling of the trailing edges of these bands. By the term "leading edge" is meant that portion of the crosslink band which first strikes the pavement on forward rotation of the wheel. The "trailing edge" is that which is last to lose contact with the pavement on forward rotation of the wheel. These results indicate that the traction device can be maintained on the tire ready for immediate service regardless of whether the pavement is bare or snow-covered without significant sacrifice in wear. The noise level with the elastomeric traction device used on bare pavement is tolerable and not significantly different from the noise ordinarily encountered with conventional traction snow tires in year-around service. Aside from the intolerable noise and vibration resulting from the use of conventional metal chains under the above-indicated conditions, the metal chains ordinarily will wear through or snap while in service for significantly less than the indicated test mileage.

Example 4

A 1960 Chevrolet is placed on artificial ice in a commercial skating rink at an ambient temperature of about 40° F. with a thin film of water wetting the surface of the ice. The vehicle is restrained against forward motion with an anchoring chain secured to the rear end of the vehicle, a tension-measuring device being placed in the chain for the purpose of measuring the tractive effort or drawbar pull of the anchored vehicle. Comparative tests are conducted as follows:

(a) A pair of traction devices made up of anti-skid traction units of the type illustrated by FIGURE 5 and made up of polyurethane rubber are mounted on the tires of the rear wheels of the vehicle, and power is applied gradually to the rear wheels to the point just short of slippage of the traction wheels, the drawbar pull being measured. In a series of six tests, the average drawbar pull is 300 pounds, the pull in some instances being as high as 495 pounds.

(b) The pair of elastomeric traction devices is removed leaving as the traction means, the conventional tread tires which had been in prior road service for about 13,000 miles. With these unaided tires, the average drawbar pull in six tests averages 152 pounds.

(c) Conventional bar-reinforced tire chains are mounted on the tires identified in test (b). With this traction means, the average drawbar pull is 525 pounds.

(d) Wheels having ordinary snow-tread tires are substituted for the regular tread tires of test (b). The average drawbar pull with these snow traction tires is about 210 pounds.

(e) Under the same conditions as indicated in (a), except that power is supplied to the rear wheels until the wheels slipped on the ice at a speed of 10 miles per hour, the drawbar pull is 137 pounds.

(f) Under the same conditions as indicated in (e), using the normal service tires without the aid of the invention traction device, the drawbar pull is 10 pounds.

These results indicate a distinct advantage in the use of the invention traction device over ordinary tires and mud-snow tread tires on slick water-wet ice, although the invention device does not match the effectiveness of metal chains under the same ice conditions.

The above results obtained with the ordinary traction means, i.e., ordinary tires, tire chains and mud-snow tires, are of the same order of magnitude as reported for tests made by the "Committee on Winter Driving Hazards" in Wisconsin.

|  | Drawbar pounds ||
| --- | --- | --- |
|  | A | B |
| Bar-reinforced tire chains | 600 | 485 |
| Mud-snow tread tires | 250 | 83 |
| Ordinary highway tires | 244 | 59 |

In test series A the drawbar pull is measured at 2.5 miles per hour on non-wet ice at 20° F. In test series B the drawbar pull is measured with the wheels slipping, the conditions otherwise being the same as in A.

Example 5

Unitary traction units, constructed of polyurethane rubber and being of the type illustrated by FIGURE 5, are installed on tires of the rear wheels of a Bagounia truck and a 1961 Chevrolet Apache pickup truck, each being used in general service at an Argentine Naval Base at Tierro del Fuego, Argentine, and on a 1958 Chevrolet 4-door sedan in personal use by an Argentine Navy officer. These vehicles are run in ordinary service by regular drivers during mid-August representing mid-winter at the southern tip of Argentine. Reported test results show excellent traction between the elastomeric anti-skid traction units and all types of road surfaces, including iced road surfaces, snow-covered roads, crushed rock, gravel and mud. Traction in mud, snow, and frozen snow is excellent for all variations in road conditions and weather conditions encountered. Under wet conditions, such as melting snow, where considerable water is available to function as a lubricant between the tire and the traction device, some slippage occurs on steep slopes having about 10% or higher grade. Resistance to slippage is improved when the tire side of the traction unit is roughened from its original mold-smooth condition and the interlocked units are at optimum tautness. No significant slippage is encountered with moderate slopes or other loading conditions having an equivalent up to about an 8% slope. No deficiencies in braking effectiveness are encountered. The elastomeric traction structures are reported as generally equivalent to metal chains in performance except on glare ice while driving up a slight incline. Of 40 units tested, only 5 early breaks under severe stress are noted, the breaks all being at about the same point beyond the tread section. The tread sections show no significant wear.

Example 6

In a series of comparative tests, a traction structure made up of traction units of the type defined by FIGURE 3 and a traction structure made up of units of the type defined by FIGURE 5 are road-tested under the same conditions, both structures having polyurethane rubber as the elastomeric material. The test speed is 45 miles per hour at an ambient temperature of 85° to 90° F. Neither structure skewed on the respective tires under operating conditions. The wear quality of the patterned tread portion is rated as best for the theta-shaped cross-member and very good for the X-shaped cross-member. The ride quality is rated good for the X-shaped cross-member and fair for the theta-shaped cross-member. For both patterned cross-members, the maximum noise level is observed at about 16 miles per hour and the character of the noise is rated good for the X-shaped member and fair for the theta-shaped member.

We claim:

1. An anti-skid traction device comprising a plurality of elastomeric traction units adapted to provide an annular, flexible, anti-skid traction structure circumferentially surrounding a pneumatic tire, each said traction unit comprising a unitary structure of elastomeric material embodying at least two transverse crosslink bands extending between and joined at the respective ends thereof to a pair of generally arcuate spring-acting side linking means separably interlockable to form peripheral loops at the respective sides of the tire, and an open network tread section consisting of the respective mid-portions of said transverse crosslink bands and at least one patterned tread cross-member integral with said mid-portions of two adjacent transverse crosslink bands, said tread cross-member consisting of a plurality of spaced-apart cross-bands including at least two said cross-bands each extending between said adjacent transverse cross-link bands and integrally joining therewith at an acute angle at the respective ends of said bands of the cross-member.

2. An anti-skid traction device comprising a plurality of interlocked elastomeric traction units adapted to provide an annular, flexible, anti-skid traction structure circumferentially surrounding a pneumatic tire, each said traction unit comprising a unitary structure of elastomeric material embodying at least two transverse crosslink bands each extending between and integrally joined at the ends thereof to a pair of generally arcuate spring-acting side member bands, and an open network tread section consisting of the respective mid-portions of said transverse crosslink bands and at least one patterned tread cross-member integral with said mid-portions of two adjacent transverse crosslink bands, said tread cross-member consisting of a plurality of spaced-apart cross-bands including at least two said cross-bands each extending between said adjacent transverse crosslink bands and integrally joining therewith at an acute angle at the respective ends of said bands of the cross-member, each said spring-acting side member band having integral therewith a pair of side linking straps adapted to be separably interlocked in end-to-end relationship with the respective side linking straps of like second and third traction units in providing a pair of peripheral side loops for annularly encircling a tire with the plurality of interlocked traction units.

3. A traction unit comprising a unitary structure of elastomeric material embodying at least two transverse crosslink bands each extending between and integrally joined at the ends thereof to a pair of arcuate spring-acting side member bands, and an open network tread section consisting of the respective mid-portions of said transverse crosslink bands and at least one patterned tread cross-member integral with said mid-portions of two adjacent transverse crosslink bands, said tread cross-member consisting of a plurality of spaced-apart cross-bands including at least two said cross-bands each extending between said adjacent transverse cross-link bands and integrally joining therewith at an acute angle at the respective ends of said bands of the cross-member, said arcuate spring-acting side member bands each having integral therewith a generally arcuate pair of side linking straps adapted to be separably interlocked in end-to-end relationship with the respective linking side straps of like second and third units in providing a pair of peripheral side loops for annularly encircling a tire with the plurality of interlocked traction units.

4. A traction unit of claim 3 wherein said patterned cross-member is X-shaped.

5. A traction unit of claim 3 wherein said patterned cross-member is theta-shaped.

6. A traction unit of claim 3 having said spring-acting side member bands wherein each said side member band includes a toroidal spring section.

7. A traction unit of claim 3 having said two pairs of integral side linking straps wherein each pair at one terminal end thereof includes at least one male linking element of a separable interlocking means and at the opposite terminal end thereof includes at least one female perforated linking element counterpart to said male linking element.

8. A traction unit of claim 7 having said separable interlocking means whereof said female linking element is a slot-like perforation and said male linking element is a dogbone-shaped pair of protuberances adapted to key with said female linking element of a like traction unit when turned through an angle of about 90° in reference to the normal rest position.

9. A traction unit of claim 8 having said separable interlocking means whereof said male linking element includes a plurality of spaced stud-like protuberances projecting substantially perpendicular to the surface of said side linking strap and said female linking element includes a plurality of spaced perforations in said side linking strap adapted to receive and interlock at least two said stud-like protuberances of a male linking element of a like traction unit.

10. An anti-skid traction device comprising a plurality of separably interlocked elastomeric traction units adapted to provide an annular anti-skid traction structure circumferentially surrounding a pneumatic tire, each said traction unit comprising a unitary structure of elastomeric polyurethane polymer material embodying a pair of transverse crosslink bands each extending between and integrally joined at the ends thereof to a pair of spring-acting side member bands, a patterned cross-member of symmetrical X-shaped design extending between and integrally joined by the ends of the legs thereof to said pair of transverse crosslink bands, said X-shaped cross-member in combination with respective portions of said transverse bands bridging the legs of said X-shaped cross-member providing said unitary structure with a tread section, said spring-acting side member bands each having integral therewith a pair of side linking straps, the terminal end of one side linking strap having a male linking element including a plurality of spaced, substantially square stud-like protuberances having grooved means for interlocking and the terminal end of a second side linking strap of said pair of linking straps having a counterpart female linking element including a plurality of spaced perforations each having lips integral therewith adapted to engage and interlock with grooves in said stud-like protuberance of a male linking element of a like traction unit, said respective spring-acting side member bands having an arcuate spring section and the respective side linking straps integral therewith being arcuate, the arc of said spring section being defined by a radial center in the direction opposite that of the radial center defining the arc of said pair of arcuate side linking straps.

References Cited in the file of this patent

UNITED STATES PATENTS

| | | |
|---|---|---|
| 1,202,726 | Karpen | Oct. 24, 1916 |
| 1,945,932 | Caley | Feb. 6, 1934 |
| 2,143,523 | Poe | Jan. 10, 1939 |
| 2,361,506 | Smith | Oct. 31, 1944 |
| 2,709,290 | Rosenthal | May 31, 1955 |